United States Patent
Cho et al.

(10) Patent No.: US 10,389,889 B2
(45) Date of Patent: Aug. 20, 2019

(54) DISPLAY APPARATUS AND CONTROL METHOD THEREOF

(71) Applicant: SAMSUNG ELECTRONICS CO., LTD., Suwon-si, Gyeonggi-do (KR)

(72) Inventors: Kyu-hyun Cho, Suwon-si (KR); Sang-young Lee, Anyang-si (KR); Hyung-sun Lee, Yongin-si (KR); Hee-seok Jeong, Suwon-si (KR); Youn-ho Choi, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/638,624

(22) Filed: Jun. 30, 2017

(65) Prior Publication Data
US 2018/0063341 A1   Mar. 1, 2018

(30) Foreign Application Priority Data
Aug. 26, 2016   (KR) .................. 10-2016-0109526

(51) Int. Cl.
*H04N 1/00* (2006.01)

(52) U.S. Cl.
CPC ...... *H04N 1/00127* (2013.01); *H04N 1/00161* (2013.01); *H04N 1/00307* (2013.01); *H04N 1/00281* (2013.01); *H04N 1/00411* (2013.01)

(58) Field of Classification Search
CPC ............. H04N 13/349; H04N 1/00408; H04N 5/23251; G06T 2207/20221; G06T 3/4053; G06T 3/4038; G06T 7/20; G06T 2207/20092; G06T 2207/20201; G06T 5/003; G06T 2207/10024; G09G 2320/0257; G09G 5/14; G09G 2330/021; G06F 3/0485; G06F 3/04845; G06F 2203/04808; G06F 1/3265; G06F 3/1446
See application file for complete search history.

(56) References Cited

U.S. PATENT DOCUMENTS

| | | | |
|---|---|---|---|
| 7,667,700 B1 * | 2/2010 | Neely, III | G06F 3/011 345/419 |
| 2002/0032546 A1 * | 3/2002 | Imamura | G06Q 30/0601 703/1 |

(Continued)

FOREIGN PATENT DOCUMENTS

| | | |
|---|---|---|
| JP | 2008-193333 | 8/2008 |
| JP | 5869177 | 1/2016 |

*Primary Examiner* — Haixia Du
(74) *Attorney, Agent, or Firm* — Nixon & Vanderhye P.C.

(57) ABSTRACT

A display apparatus and a control method thereof are provided. The display apparatus includes an image processor, a display and a controller. The image processor processes an input image to generate an output image. The display displays the generated output image. The controller is configured to control the image processor to generate an output image of an region corresponding to the moved viewpoint, in response to a viewpoint being moved with respect to an input image generated for a predetermined bearing to enable the viewpoint to be moved, and to provide an image effect based on or corresponding to a speed at which the viewpoint is moved while the viewpoint is moved. With this, a dizziness and a sense of difference, which may break out when the viewpoint is moved in a speed a user does not intend, are improved and a new experiences is provided for a user.

17 Claims, 12 Drawing Sheets

(56) References Cited

U.S. PATENT DOCUMENTS

| | | | |
|---|---|---|---|
| 2010/0085380 A1* | 4/2010 | Tsuda | G06F 3/0485 345/629 |
| 2011/0161864 A1* | 6/2011 | Nagasaka | G01C 21/367 715/784 |
| 2015/0364073 A1* | 12/2015 | Ogawa | G06F 3/0485 345/690 |
| 2016/0012855 A1 | 1/2016 | Krishnan | |
| 2016/0189423 A1* | 6/2016 | Kaeser | G06F 3/012 345/420 |
| 2017/0076496 A1 | 3/2017 | Inomata et al. | |

\* cited by examiner

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2016-0109526, filed on Aug. 26, 2016 in the Korean Intellectual Property Office, the disclosure of which is incorporated by reference herein in its entirety.

BACKGROUND

Field

The present disclosure relates generally to a display apparatus and a control method thereof, and for example, to a display apparatus, which provides an image effect when a viewpoint is moved, thereby enhancing a user convenience and providing a new experience, and a control method thereof.

Description of Related Art

In recent, a display apparatus may provide various images or videos. A 360 degree image as one of such images is implemented by a technology, which captures a panoramic image with several cameras or a camera having a plurality of lenses mounted thereon and maps the captured panoramic image to a virtual space to show a user a screen and thus to make the user interact with and feel the screen like as if she or he is in a real space. To provide the 360 degree image, the display apparatus provides converting an region corresponding to a viewpoint selected by the user in a spherical image into a planar region, or zooming in or out an image being displayed.

If the viewpoint is moved by a user input or the like, the region corresponding to the viewpoint is also changed and the display apparatus provides an image of the moved region. However, if the viewpoint is moved too fast, e.g., faster than a speed the user intends when the viewpoint is moved, the user may feel dizziness or sense of difference due to the too fast screen change. Also, if the user has less experience with respect to the 360 degree image not to quite know how to operate the input apparatus, it is need to provide information on movement and moving speed of the viewpoint or a guide about correctly moving the viewpoint.

SUMMARY

Example embodiments address at least the above problems and/or disadvantages and other disadvantages not described above.

The example embodiments may provide a display apparatus, which provides an image effect based on a speed at which a viewpoint is moved when the viewpoint is moved, thereby improving a user's experience by reducing dizziness due to the movement of the viewpoint and proving a new experience for the user, and a control method thereof.

According to an aspect of an example embodiment, a display apparatus is provided, the display apparatus including: an image processor configured to process an input image to generate an output image; a display configured to display the generated output image; and a controller configured to control the image processor to generate an output image of an region corresponding to the moved viewpoint, in response to a viewpoint being moved with respect to an input image generated for a predetermined bearing to enable the viewpoint to be moved, and to provide an image effect corresponding to a speed at which the viewpoint is moved while the viewpoint is moved. Accordingly, a user's dizziness due to screen changes according to the movement of the viewpoint may be improved, e.g., reduced.

The controller may be configured to provide the image effect in response to the speed at which the viewpoint is moved based on exceeding a critical speed. Thus, actual use patterns or types may be considered to provide an improved convenience.

The controller may be configured to control the image processor to not provide the image effect until a predetermined time elapses in a state where the speed at which the viewpoint is moved exceeds the critical speed. Thus, a user's intention of moving the viewpoint over the critical speed may be concretely considered to provide an improved convenience.

The controller may be configured to change the viewpoint into a predetermined compulsory viewpoint in response to the speed at which the viewpoint is moved exceeding the critical speed. Thus, it is possible to correct viewpoint movements due to user's poor operating or equipment errors thereby to provide an improved convenience.

The controller may be configured to control the image processor to provide the image effect based on further an acceleration at which the viewpoint is moved. Thus, the user's use patterns or types may be further considered to provide an improved convenience.

The controller may be configured to control the image processor to provide a first image effect when the speed at which the viewpoint is moved is increased and a second image effect different from the first image effect when the speed at which the viewpoint is moved is decreased. Thus, the image effect may be provided based on the use patterns or types to provide various experiences for the user.

The controller may be configured to control the image processor to provide an image effect, which changes at least one of a brightness, a clarity, a contrast, a tint and a resolution to a degree corresponding to the speed at which the viewpoint is moved. Thus, various examples of image effects may be introduced.

The controller may be configured to control the display to provide information with respect to the speed at which the viewpoint is moved. Thus, the user may move the viewpoint with reference to the provided information, and thereby a usability is improved.

The information may include at least one of a direction where the viewpoint is moved, a speed at which the viewpoint is moved, and a distance where the viewpoint has been moved from a predetermined standard viewpoint. Thus, various examples included in the information may be introduced.

The image effect may include a provision of user interface (UI), and the controller may be configured to change the UI in at least one of a brightness, a color, an opacity, a size, and a number of items corresponding to the speed at which the viewpoint is moved. Thus, various examples of image effects, which make the user experience speed thrills at which the viewpoint is moved, may be introduced.

According to an aspect of another example embodiment, method of controlling a display apparatus is provided, the method including: processing an input image to generate an output image; and displaying the generated output image, wherein the processing comprises generating an output image of an region corresponding to the moved viewpoint in response to a viewpoint being moved with respect to an input image generated for a predetermined bearing to enable the viewpoint to be moved, and providing an image effect corresponding to a speed at which the viewpoint is moved while the viewpoint is moved. Accordingly, a user's dizziness due to screen changes according to the movement of the viewpoint may be improved, e.g., reduced.

The providing may include providing the image effect in response to the speed at which the viewpoint is moved exceeding a critical speed. Thus, actual use patterns or types may be considered to provide an improved convenience.

The providing may include not providing the image effect until a predetermined time elapses in a state where the speed at which the viewpoint is moved exceeds the critical speed. Thus, a user's intention of moving the viewpoint over the critical speed may be concretely considered to provide an improved convenience.

The providing may include changing the viewpoint into a predetermined compulsory viewpoint in response to the speed at which the viewpoint is moved exceeding the critical speed. Thus, it is possible to correct viewpoint movements due to user's poor operating or equipment errors thereby to provide an improved convenience.

The providing may include providing an image effect based on further an acceleration at which the viewpoint is moved. Thus, the user's usage patterns or types may be further considered to provide an improved convenience.

The providing the image effect based on further the acceleration may include providing a first image effect when the speed at which the viewpoint is moved is increased and a second image effect different from the first image effect when the speed at which the viewpoint is moved is decreased. Thus, the image effect may be provided according the use patterns or types to provide various experiences for the user.

The providing may include providing an image effect, which changes at least a portion of the output image in at least one of a brightness, a clarity, a contrast, a tint and a resolution. Thus, various examples of image effects may be introduced.

The method may further include providing information with respect to the speed at which the viewpoint is moved. Thus, the user may move the viewpoint with reference to the provided information, and thereby a usability is improved.

The information may include at least one of a direction where the viewpoint is moved, a speed at which the viewpoint is moved, and a distance where the viewpoint has been moved from a predetermined standard viewpoint. Thus, various examples included in the information may be introduced.

The image effect may include a provision of user interface (UI), and the controller may be configured to change the UI in at least one of a brightness, a color, an opacity, a size, and a number of items corresponding to the speed at which the viewpoint is moved. Thus, various examples of image effects, which make the user experience speed thrills at which the viewpoint is moved, may be introduced.

As described above, according to various example embodiments, the display apparatus may provide the image effect according to the speed at which the viewpoint is moved when the viewpoint is moved, thereby improving the user's dizziness due to the movement of the viewpoint and proving the new experience for the user.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
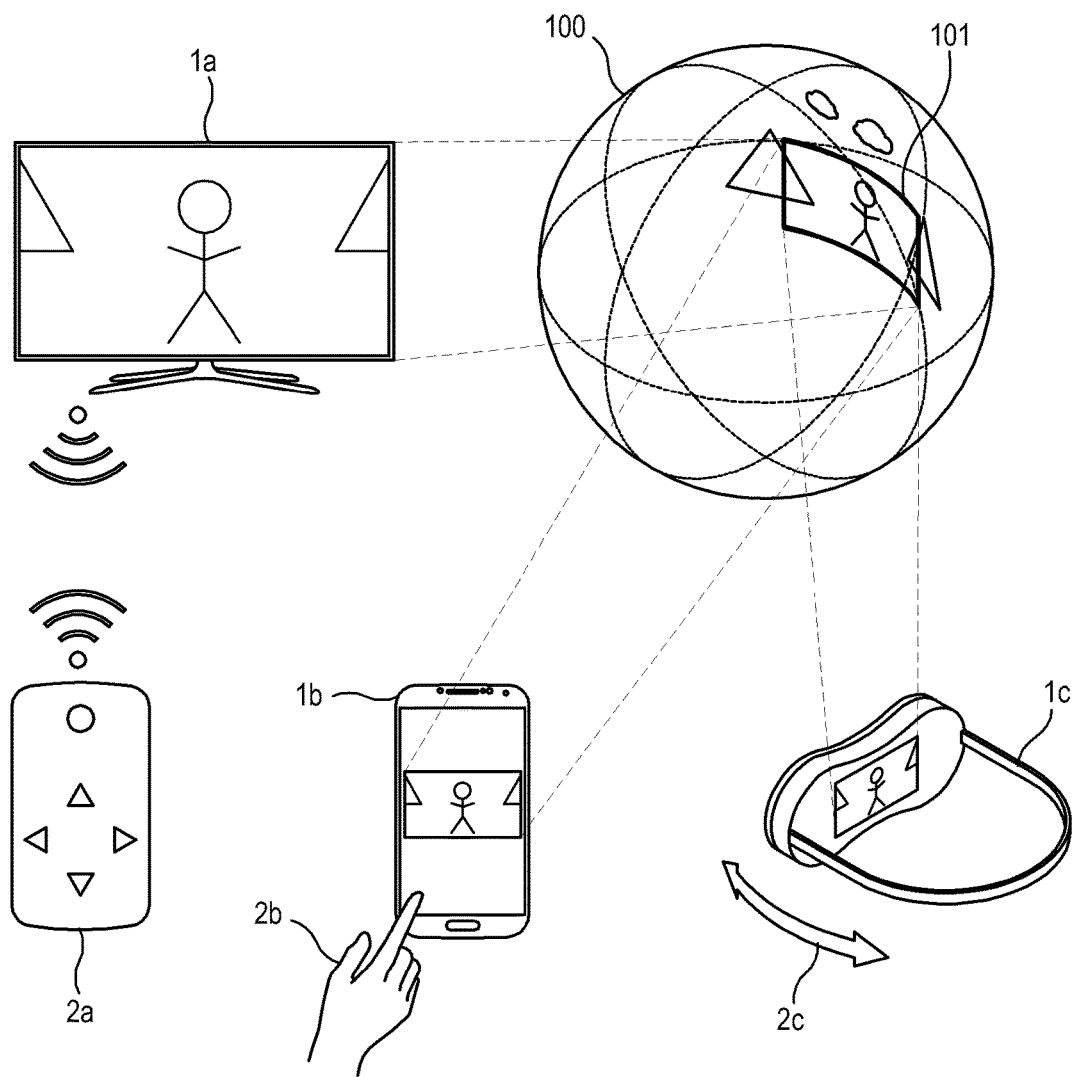
FIG. 1 is a diagram illustrating an example display apparatus according to an example embodiment.

Hereinafter, various example embodiments will be described in greater detail with reference to accompanying drawings. Features illustrated in the accompanying drawings are referred to in the following descriptions of the example embodiments and for clarity, like reference numerals or symbols presented in respective drawings denote like elements, which substantially perform the same functions.

FIG. 1 is a diagram illustrating an example display apparatus according to an example embodiment. The display apparatus 1a, 1b and/or 1c according to an example embodiment may be implemented as a television (TV). In another example embodiments, the display apparatus 1a, 1b and/or 1c may be implemented as an apparatus capable of outputting an image, which include a smart phone, a tablet personal computer (PC), a mobile phone, a computer, a multimedia reproducing device, an electronic picture frame, a digital advertising board, a large format display (LFD), a signage, a set-top box, a smart watch, a wearable device such as a head-mounted display (HMD), a smart refrigerator, etc. However, the present disclosure is not limited thereto.

In the example embodiment, the display apparatus 1a, 1b and/or 1c may be implemented as an apparatus, which can process a received image to output an image. In the example embodiment, the display apparatus 1a, 1b and/or 1c processes one region 101 corresponding to a viewpoint from within an input image 100 to obtain an output image for the region, and displays the obtained output image on a screen. In the example embodiment, the input image 100 may be an image generated from a plurality of images, each of which are obtained with respect to different bearings from one other by a camera having at least one or more lens mounted thereon to enable the viewpoint to be moved. In some cases, the at least one or more lens may be a wide angle lens. However, means for generating the input image 100 is not limited thereto. For example, the input image 100 may be an image generated by a plurality of cameras. The display apparatus 1a, 1b and/or 1c may receive the input image 100 from at least one camera, or from an external apparatus, such as a server, a universal serial bus (USB) storage device, a computer, etc. In another example embodiment, the display apparatus may include at least one camera.

In the example embodiment, if the viewpoint is moved, the display apparatus 1a, 1b and/or 1c displays an output image of a region corresponding to the moved viewpoint, and provides an image effect according to a speed at which the viewpoint is moved while the viewpoint is moved. A moving direction of the viewpoint is not limited. The display apparatus 1a, 1b and/or 1c may move the viewpoint up and down and left and right, or forward and backward. The movement of the viewpoint may include zooming in and out the screen.

Figure 2:
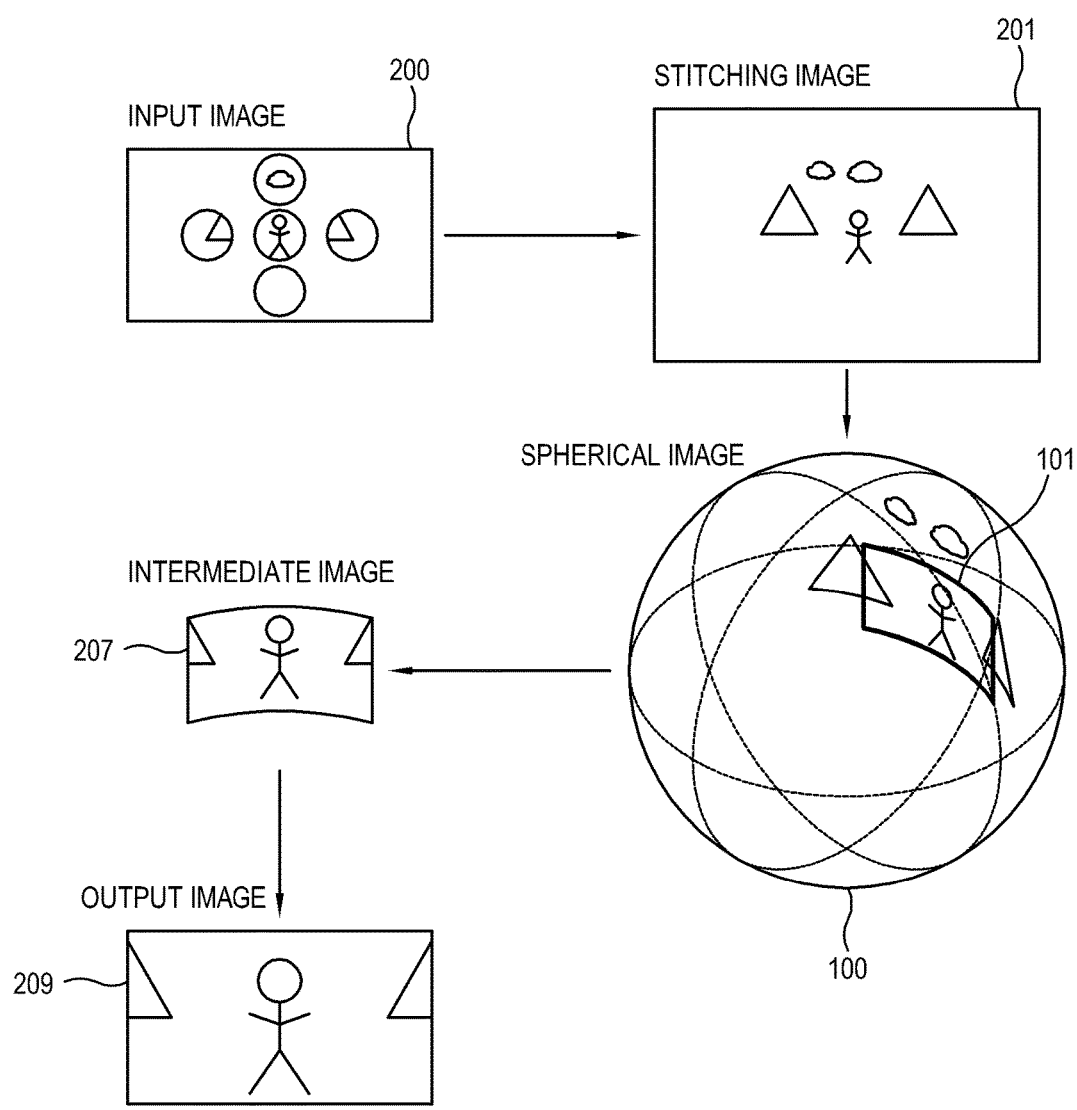
FIG. 2 is a diagram illustrating an example process of processing an obtained image by a display apparatus according to an example embodiment.

First, with reference to FIG. 2, a process of displaying an output image from an input image by the display apparatus according to an example embodiment will be described in detail. The display apparatus receives an input image 200 including a plurality of images, each of which is obtained with respect to different bearings from one other by at least one camera or a camera having at least one lens. To display an output image 209, the display apparatus according to an example embodiment performs at least one image processing with respect to the received input image 200. For example, the display apparatus maps and connects (or stitches) the received input image 200 to an equirectangular by using a high dynamic range imaging (HDRI) map method to generate a stitching image 201. The stitching image 201 according to an example embodiment is not limited to being generated by the HDRI map method and may be generated by a cube map method, which maps six-directionally obtained images to a cube which is a regular hexahedron. The display apparatus maps the stitching image 201 in a spherical shape to generate a spherical image 203.

The stitching image 201 or the spherical image 203 in which the stitching image 201 is mapped in the spherical shape according to an example embodiment is an example of the input image in a broad sense of the present disclosure, but the input image 200 of the present disclosure is not limited thereto.

The display apparatus generates an intermediate image 207 from one region 101 corresponding a viewpoint from within the spherical image 203. As another example, the display apparatus may not generate the intermediate image 207 from the spherical image 203, but directly from one region of the stitching image 201.

The display apparatus performs an image processing with respect to the intermediate image 207 to generate the output image 209. The image processing, which is performed with respect to the intermediate image 207, may include a so-called warping, which is a processing of converting a curved image into a planar image to match a coordinate of the image to a new position.

The selection of the one region 101 corresponding to the viewpoint according to an example embodiment may be determined by a user. For example, according to a user input of moving the viewpoint while the screen is displayed, the display apparatus may determine one region 101 selected corresponding to the moved viewpoint. As another example, if receiving a user input of zooming in or out the screen while the screen is displayed, the display apparatus may determine one region 101 corresponding to a viewpoint according to the zooming in or out of the screen. A user command of moving the viewpoint (hereinafter, also referred as a 'viewpoint moving command') may be received via a remote controller 2a. The display apparatus 1a, 1b, and/or 1c may receive the viewpoint moving command using many input means, such as a touch of finger 2b, a movement 2c of HMD, etc.

Figure 3A:
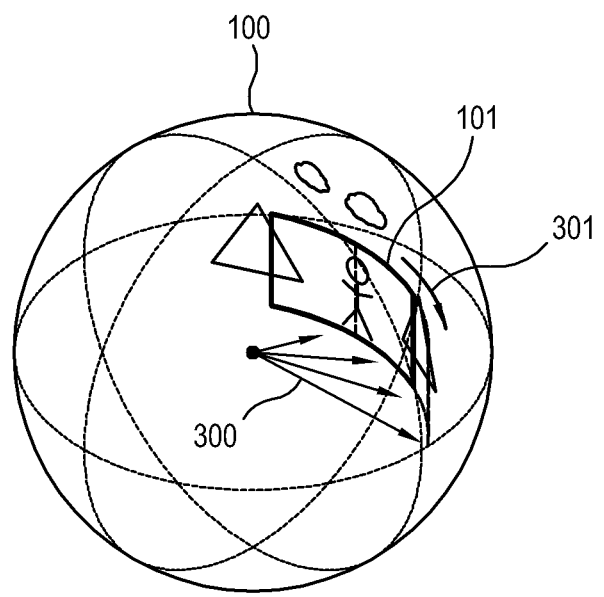
FIGS. 3A and 3B are diagrams illustrating an example process of moving a viewpoint by a display apparatus according to an example embodiment.
Figure 3B:
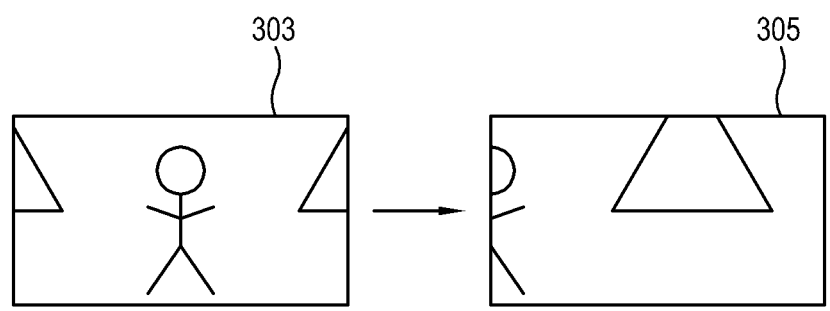

The display apparatus changes a region displayed on the screen to correspond to the moved viewpoint. Hereinafter, with reference to FIGS. 3A and 3B, a process in which the viewpoint is moved while the screen is displayed will be described. Based on a viewpoint moving command or the like input from the user, the display apparatus moves a viewpoint 300 along a corresponding direction 301. FIG. 3A illustrates a process in which the viewpoint 300 is moved along the direction 301 in an input image 100 to change an region 101 corresponding to the viewpoint 300, and FIG. 3B illustrates a screen 303 before the viewpoint 300 is moved and a screen 305 after the viewpoint 300 is moved.

In other words, the display apparatus changes the region 101 displayed on the screen to correspond to the moved viewpoint 300. The display apparatus displays an output image (209 in FIG. 2) corresponding to the changed region 101. The display apparatus provides an image effect based on a speed at which the viewpoint 300 is moved while the viewpoint 300 is moved. The image effect may include changing the output image 209 in at least one of a brightness, a resolution (also referred as a 'definition of resolution') and a contrast, but the present disclosure is not limited thereto. The image effect will be described later. With this, the display apparatus according to an example embodiment may prevent a dizziness and a sense of difference, which break out as the viewpoint 300 is moved in a fast speed that the user does not intend to cause the screen to change too fast, and may provide a new experience for the user.

Figure 4:
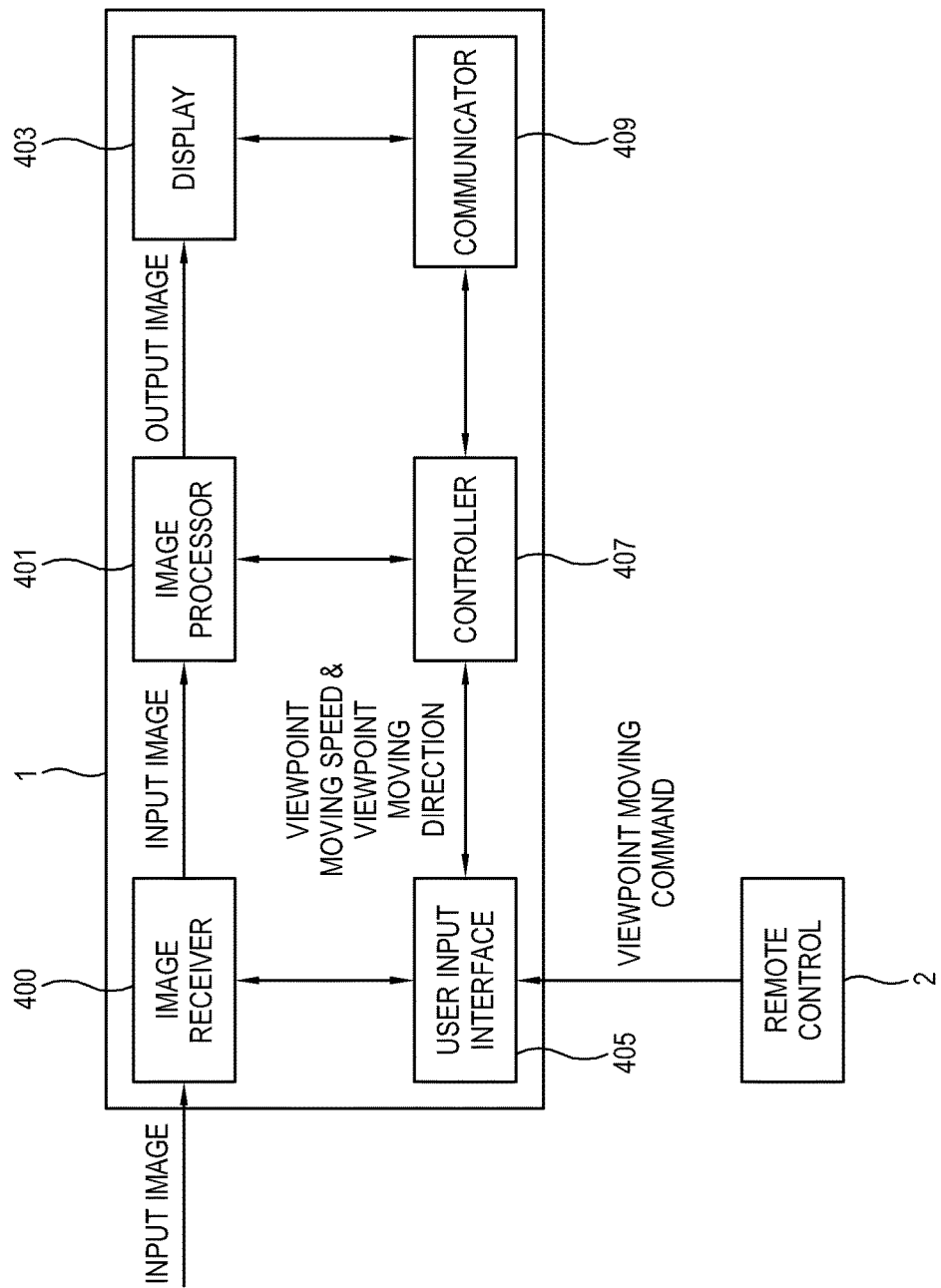
FIG. 4 is a block diagram illustrating an example display apparatus according to an example embodiment.

FIG. 4 is a block diagram illustrating an example display apparatus according to an example embodiment. The display apparatus 1 according to an example embodiment includes an image processor (e.g., including processing circuitry) 401, a display 403, and a controller (e.g., including processing circuitry) 407. The display apparatus 1 according to an example embodiment may further include at least one of an image receiver (e.g., including image receiving circuitry) 400, a user input interface (e.g., including input circuitry) 405, a storage (not shown) and a communicator (e.g., including communication circuitry) 409. The configuration of the display apparatus 1 according to an example embodiment illustrated in FIG. 4 is merely an example and may be implemented in configurations other than that illustrated in FIG. 4. In other words, the display apparatus according to an example embodiment may be implemented as including additional elements other than those illustrated in FIG. 4 or removing any one from among elements illustrated in FIG. 4.

The image receiver 400 may include various image receiving circuitry and receives an image signal including an input image 100. The image receiver 400 may be provided with a tuner for receiving the image signal. The tuner may receive tuning a broadcast signal of any one selected by the user from among a plurality of channels. The image receiver 400 may receive the image signal from an image processing apparatus, such as a Set-top box, a digital versatile disc (DVD) player, and a PC, a mobile apparatus, such as a smart phone, or a server via an internet, or the like, but is not limited thereto.

The communicator 409 may include various communication circuitry and communicates with an external apparatus. The communicator 409 may receive the input image 100 from the external apparatus. The communicator 409 is implemented in many methods according to methods of implementing the external apparatus or the display apparatus 1. For example, the communicator 409 may include a connector for wired communication. The connector may transmit and receive signals/data according to standards, such as a high definition multimedia interface (HDMI), a HDMI-consumer electronics control (HDMI-CEC), a USB, a component and so on, and include at least one connecting part or terminal corresponding to the respective standards. The communicator 409 may communicate with a plurality of servers via a wired local area network (LAN).

The communicator 409 may be implemented in many other communication methods beside the connector including the connecting part or the terminal for wired communication. For example, the communicator 409 may include a radio frequency (RF) circuit for transmitting and receiving a RF signal to communicate by wireless with the external apparatus, and may be configured to communicate using one or more protocol from among wireless fidelity (Wi-Fi), Bluetooth (BT), Zigbee, ultra-wide band (UWB), wireless USB, and near field communication (NFC).

The user input interface 405 may include various input circuitry and receives a user input to transmit to the controller 407. The user input interface 405 may be implemented in many types according to methods of the user input. The user input interface 405 may include various input circuitry, such as, for example, and without limitation, a menu button installed on an outer side the display apparatus 1, a remote control signal receiver to receive a remote control signal corresponding to the user input from a remote controller (also referred to a 'remote control'), a touch screen provided on the display 403 to receive a touch input of user, a camera to sense a gesture input of user, a microphone to recognize a voice input of user, a sensor to sense a movement of user, etc.

The user input interface 405 receives the viewpoint moving command directly or via the remote control 2 from the user. Based on the received viewpoint moving command, a direction, a distance or the like to make a viewpoint (300 in FIG. 3) move and a speed at which the viewpoint 300 is moved (hereinafter, also referred as a 'viewpoint moving speed') may be determined. The viewpoint moving speed may be variously determined according types of input means, which receive the viewpoint moving command. For example, if the viewpoint moving commands in the same direction are repeatedly received more than predetermined number of times for a unit time or received for more than predetermined time, the viewpoint moving speed may be determined as being increased. However, the determination of the viewpoint moving speed is not limited thereto.

Figure 5:
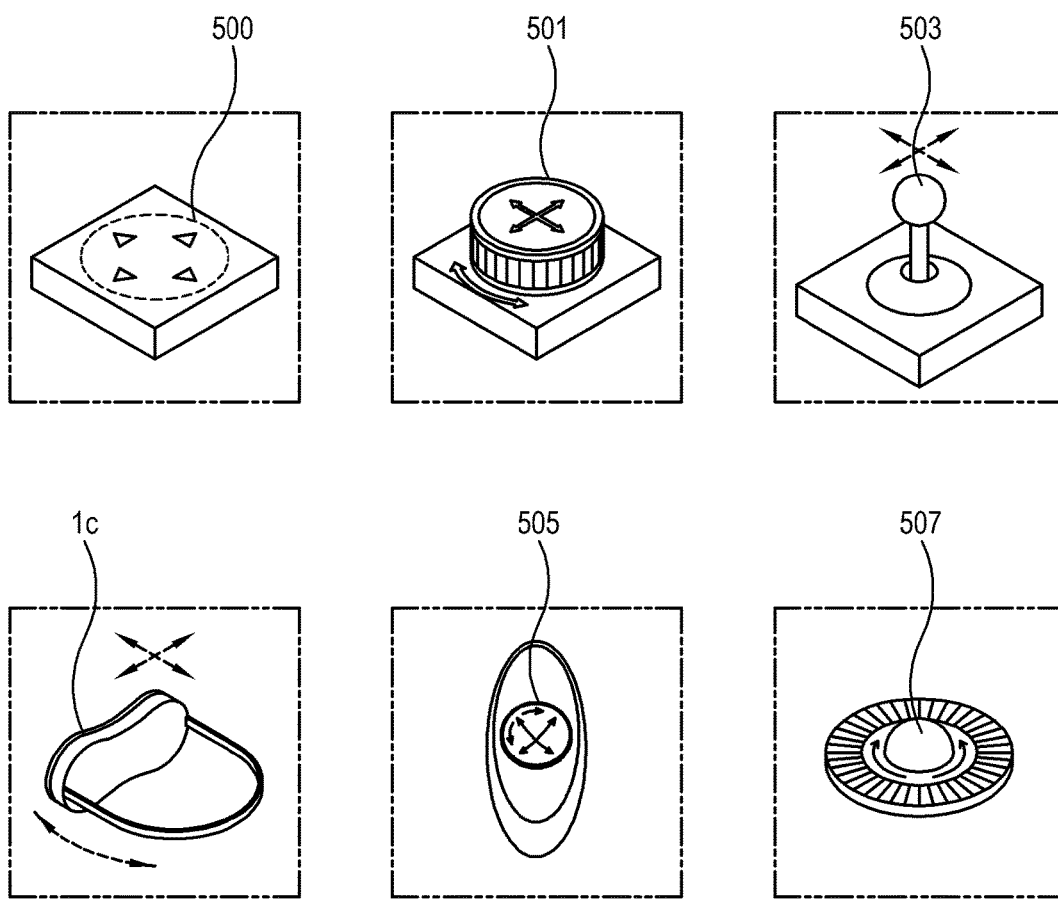
FIG. 5 is a diagram illustrating example manipulation apparatuses according to an example embodiment.

Hereinafter, with reference to FIG. 5, types of the input circuitry, a process of inputting the viewpoint moving command, and a method of determining the viewpoint moving speed will be described in greater detail. The user input interface 405 or the remote control 2 of the display apparatus 1 may include variously implemented input means 500 to 507. To input the viewpoint moving command, the user pushes, rotates or moves the input means 500, 501, 503, 505 and 507. For example, the user pushes a four-way key 500 to move a viewpoint (300 in FIG. 3) up and down and left and right. Otherwise, the user may rotate a jog-shuttle 501 to rotate the viewpoint 300 or to zoom in or out the screen, and may tilt the jog-shuttle 501 up and down and left and right or push a button provided on a top of the jog-shuttle 501 to move the viewpoint 300. In case of a joystick 503, the user may move the joystick 503 to move the viewpoint 300. In case of a HMD 1*c*, the user may turn her or his head in a direction she or he wants to move the viewpoint 300 while wearing the HMD 1*c*. In case of a touch pad 505, the user may touch the touch pad 505 with her or his finger and rotate, move or push her or his finger in a direction to move the viewpoint 300. Otherwise, the user may roll a track ball 507 or operate an additional button to move the viewpoint 300. Or, if the display apparatus 1 is implemented as a mobile phone or the like including the touch screen, the user may touch the screen or input a preset gesture with a finger 2*b*, a touch pen and so on to move the viewpoint 300. In FIG. 5, various examples of the input means for receiving the viewpoint moving command are illustrated, but the input means of the present disclosure is not limited thereto.

The user may operate the input means 500 to 507 to move the viewpoint 300 in a speed she or he wants, as well as in the direction she or he wants. For example, the viewpoint moving speed may be determined according to types in which the user operates the four-way key 500, the jog-shuttle 501, the joystick 503, the touch pad 504, the track ball 507 and so on. To be more specific, if the user push the four-way key 500, the viewpoint moving speed may be determined according to a time or frequency where the user pushes the four-way key 500. If the user touches the touch pad 505 or moves the joystick 503, the viewpoint moving speed may be also determined in the same method as that in the four-way key. As another example, if the user rotates the jog-shuttle 501 or moves the track ball 507, the viewpoint moving speed may be determined according to a speed of rotating the jog-shuttle 501 or moving the track ball 507. As other example, in case of the HMD 1*c,* the viewpoint moving speed may be determined according to a speed that the user moved her or his head.

The storage is configured to store various data of the display apparatus 1. The storage may be provided with a writable non-volatile memory to retain the stored data even if the display apparatus 1 is turned off and to reflect any changes in the stored data. In other words, the storage may be provided with any one of a flash memory, an erasable programmable read only memory (EPROM) and an electrically erasable and programmable read only memory (EEPROM). The storage may further include a volatile memory, such as a dynamic random access memory (DRAM) or a static random access memory (SRAM) having faster read or write speed than the non-volatile memory.

The image processor 401 may include various image processing circuitry and performs an image processing with respect to the image signal of the input image 100 received via the image receiver 400 and outputs the processed image signal to the display 403 to display the output image 209 on the display 403. Under a control of the controller 407, the image processor 401 may perform the image processing with respect to one region 101 corresponding to one viewpoint to generate the output image 209. Also, if the viewpoint is changed, the image processor 401 generates an output image 209 of a region corresponding to the moved viewpoint. The image processor 401 may be implemented as one or more hardware and/or software module or a combination thereof.

The display 403 displays the output image 209 received from the image processor 401 in which the image processing is performed with respect to one region 101 corresponding to one viewpoint from within the input image 100. Implemented types of the display 403 are not limited, and the display 403 may be implemented in various types, such as a liquid crystal display (LCD), a plasma display panel (PDP), an organic light emitting diodes (OLED), a surface-conduction electron-emitter, a carbon nano-tube, a nano-crystal display, or the like, but is not limited thereto.

If the display 403 is the LCD type, the display 403 includes a LCD panel, a backlight unit to supply light to the LCD panel, a panel driving board to drive the LCD panel, and so on. The display 403 may be also implemented as an OLED panel, which is a spontaneous emission panel, without the backlight unit.

The controller 407 may include various processing circuitry and performs control needed for operating all the elements of the display apparatus 1. The controller 407 may include a control program for controlling to perform the control operation as described above, a non-volatile memory in which the control program is installed, a volatile memory in which at least one of the control program is loaded, and at least one microprocessor or central processing unit (CPU) for executing the loaded control program. The control program may include a program (or programs) which is implemented in the form of at least one of a BIOS, a device driver, an operating system, a firmware, a platform, and an application program (application). As an example embodiment, the application program may be installed or stored in advance in the display apparatus 1 in manufacturing, or installed in the display apparatus 1 based data received from the outside in use. The data of the application program may be downloaded to the display apparatus 1 from an external server, such as, for example, an application market or the like.

According to an example embodiment, the controller 407 controls the image processor 401 to process one region 101 corresponding to one viewpoint 300 from within the input image 100. If the viewpoint 300 is moved, the controller 407 controls the image processor 401 to process one region 101 corresponding to the moved viewpoint 300. The controller 407 controls the image processor 401 to provide an image effect according to a speed at which the viewpoint 300 is moved while the viewpoint 300 is moved. The controller 407 controls the display 403 to display the output image 209 and the image effect generated by the image processor 401. According to another example embodiment, the controller 407 controls the display 403 to additionally display information related to the speed at which the viewpoint 300 is moved.

Hereinafter, the image effect, which is provided according to the speed at which the viewpoint 300 is moved by the display apparatus 1, will be described in detail. The image effect provided by the display apparatus may be an effect in which at least a portion of the image is changed to a degree corresponding to the speed at which the viewpoint is moved in at least one of a brightness, a clarity, a contrast, and a resolution (also referred as a 'definition of resolution'). Otherwise, the image effect may be an effect of changing at least a portion of the image in a tint, adding a new image, skipping some frames from among a plurality of frames of the image, or the like. The image effect may be an effect, which can prevent a user's dizziness or provide a new experiences for the user. The image effect according to an example embodiment may be variously implemented and is not limited to illustrations and explanations as described above.

Figure 6:
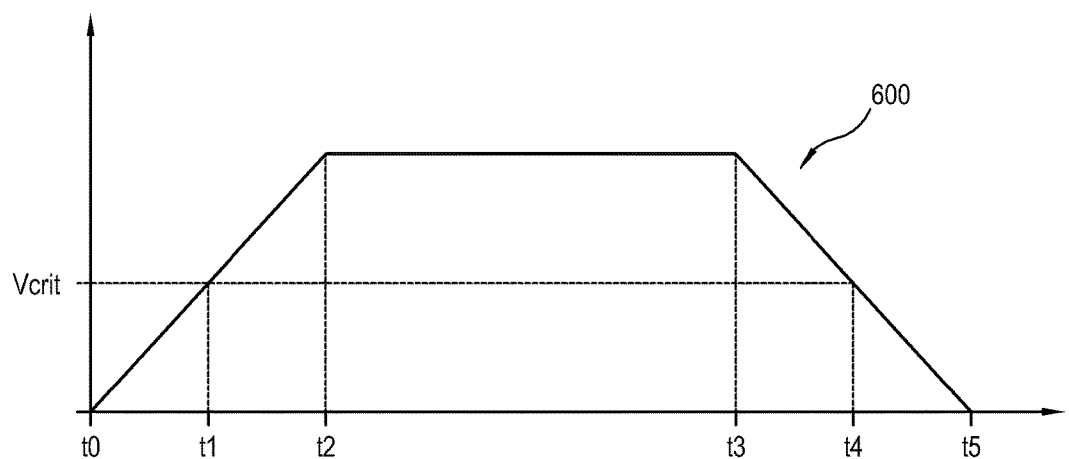
FIG. 6 is a diagram illustrating an example waveform of a speed at which the viewpoint is moved according to an example embodiment.

FIG. 6 is a diagram illustrating an example waveform of a speed at which the viewpoint is moved according to an example embodiment. The waveform illustrated in FIG. 6 shows a change in the viewpoint moving speed according to an example embodiment, and the present disclosure is not limited thereto. A graph 600 plots a time where the viewpoint (300 in FIG. 3) is moved on an X-axis and a speed at which the viewpoint 300 is moved on a Y-axis Y. The viewpoint 300 begins to move at a time t0. The speed at which the viewpoint 300 is moved grows with time and arrives at a critical speed Vcrit at a time t1. The viewpoint 300 is moved in the same speed at a time section t2~t3. The speed at which the viewpoint 300 is moved begins to decrease from a time t3 and falls below the critical speed Vcrit at a time t4. The viewpoint 300 stops moving at a time t5. A time section t0~t2 corresponds to an accelerated moving section of the viewpoint 300 and a time section t3~t5 corresponds to a decelerated moving section of the viewpoint 300.

Figure 7:
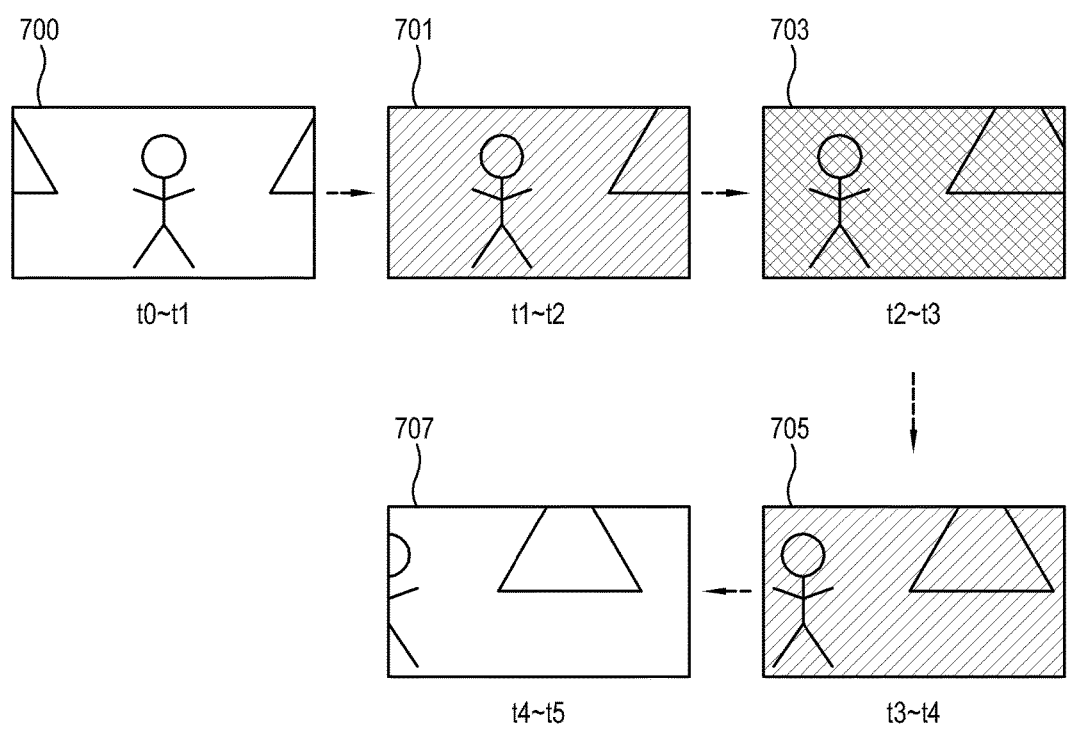
FIG. 7 is a diagram illustrating an example process of providing an image effect based on a speed at which the viewpoint is moved according to an example embodiment, in accordance with the waveform of FIG. 6.

FIG. 7 is a diagram illustrating an example process of providing an image effect according to each time section of the graph (600 in FIG. 6) by the display apparatus 1 according to an example embodiment. The display apparatus 1 may provide a predetermined image effect if a speed at which the viewpoint (300 in FIG. 3) is moved exceeds the critical speed Vcrit. The display apparatus 1 may provide different image effects according to whether the viewpoint 300 is accelerated or decelerated. For example, the display apparatus 1 may provide mutually contrasted image effects as the speed at which the viewpoint 300 is moved increases or decreases. For example, if the speed at which the viewpoint 300 is moved increases, the display apparatus 1 decreases an image's brightness according to the increased speed, and if the speed at which the viewpoint 300 is moved decreases, increases the image's brightness according to the decreased speed.

In FIG. 7, a reference numeral 700 may refer, for example, to a first image 700 in which the image effect is not provided after the viewpoint 300 begins to move and before the speed at which the viewpoint 300 is moved exceeds the critical speed Vcrit, at a time section t0~t2. A reference numeral 701 may refer, for example, to a second image 701 to which the image effect is added when the speed at which the viewpoint 300 is moved increases to exceed the critical speed Vcrit, at a time section t1~t2. Examples of the image effect may include, for example, decreasing the brightness, reducing the clarity or so on, but the present disclosure is not limited thereto. A reference numeral 703 may refer, for example, a third image 703 in which the image effect is provided in a degree higher than the second image 701 when the speed at which the viewpoint 300 is moved reaches a maximum value, at a time section t2~t3. Examples of the image effect may include, for example, more decreasing the brightness of the third image 703 than that of the second image 701, more reducing the clarity of the third image 703 than that of the second image 701 or so on, but the present disclosure is not limited thereto. A reference numeral 705 may refer, for example, to a fourth image 705 in which when the speed at which the viewpoint 300 is moved is decreased, the image effect is provided corresponding to the decreased speed, at a time section t3~t4. In other words, the fourth image 705 is configured to provide an image effect, which is contrasted with that at a time section where the speed at which the viewpoint 300 is moved increases. Examples of the image effect may include, for example, increasing the brightness, raising the clarity or so on, but the present disclosure is not limited thereto. A reference numeral 707 may refer, for example, to a fifth image 707 in which the speed that as the viewpoint 300 is moved falls below the critical speed Vcrit, the image effect is not provided, at a time section t4~t5.

Figure 8:
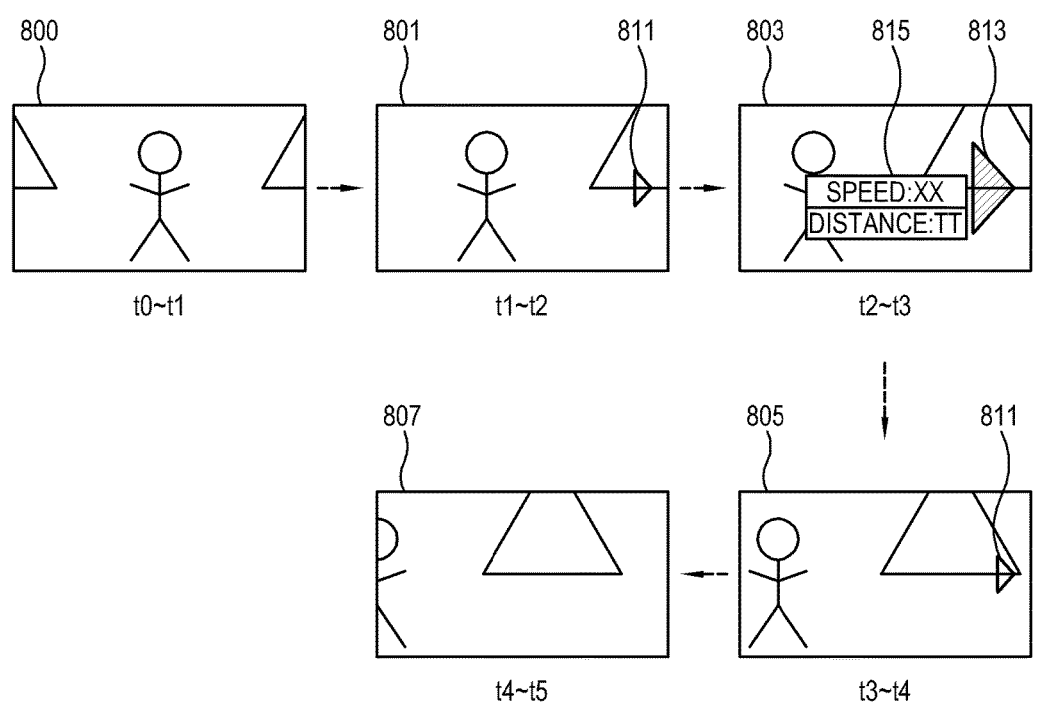
FIG. 8 is a diagram illustrating an example process of providing a user interface (UI) based on a speed at which the viewpoint is moved according to an example embodiment, in accordance with the waveform of FIG. 6.

FIG. 8 is a diagram illustrating an example process of varying and providing a user interface (UI) based on each time section of the graph (600 in FIG. 6) by the display apparatus 1 according to an example embodiment. The display apparatus 1 may provide information on a speed at which the viewpoint (300 in FIG. 3) is moved. The information on the speed may include at least one of a speed at which the viewpoint 300 is moved, a direction where the viewpoint 300 is moved, and a distance where the viewpoint 300 has been moved from a predetermined standard viewpoint. The display apparatus 1 may provide a UI including items 811, 813, and 815 corresponding to each of the information on the speed while the viewpoint 300 is moved. The display apparatus 1 may change the UI in at least one of a brightness, a color, an opacity, a size, and a number of items according to the speed at which the viewpoint 300 is moved. Properties of the UI, which are changed according to the speed at which the viewpoint 300 is moved, are not limited thereto.

In FIG. 8, a reference numeral 800 may refer, for example, to a first image 800 in which the image effect is not provided after the viewpoint 300 begins to move and before the speed at which the viewpoint 300 is moved exceeds the critical speed Vcrit, at a time section t0~t1. A reference numeral 801 may refer, for example, to a second image 801 in which when the speed at which the viewpoint 300 is moved increases to exceed the critical speed Vcrit, a viewpoint moving direction 811 corresponding to the direction where the viewpoint 300 is moved is provided, at a time section t1~t2. A reference numeral 803 may refer, for example, to a third image 803 in which when the speed at which the viewpoint 300 is moved reaches a maximum value, a viewpoint moving direction 813 and information 815 on a viewpoint moving speed and a distance moved from the predetermined standard viewpoint are provided, at a time section t2~t3. Since the third image 803 has more increased in the speed at which the viewpoint 300 is moved than the second image 801, the third image 803 includes more items 813 and 815. Also, the item 813 denoting the viewpoint moving direction in the third image 803 is large in size and opaque to show faster speed thrills than the item 811 denoting the viewpoint moving direction in the second image 801. A reference numeral 805 may refer, for example, to a fourth image 805 in which as the speed at which the viewpoint 300 is moved is decreased, an item 811 denoting the viewpoint moving direction reduced in size is provided, at a time section t3~t4. A reference numeral 807 may refer, for example, to a fifth image 807 in which as the speed at which the viewpoint 300 is moved falls below the critical speed Vcrit, the image effect is not provided, at a time section t4~t5.

As another example embodiment, information on the movement of the viewpoint 300 may be provided when the viewpoint 300 is moved regardless of whether the speed at which the viewpoint 300 is moved exceeds the critical speed Vcrit.

Although in FIG. 8, the UIs of the images 801, 803 and 805 illustrate the viewpoint moving only in directions 811 and 813 and the information 815 on the viewpoint moving speed and the viewpoint moving distance, the present disclosure is not limited thereto. The display apparatus 1 may provide the information related to the movement of the viewpoint 300 in various types while the viewpoint 300 is moved, and may change types in which the information is provided according to the speed at which the viewpoint 300 is moved.

Figure 9:
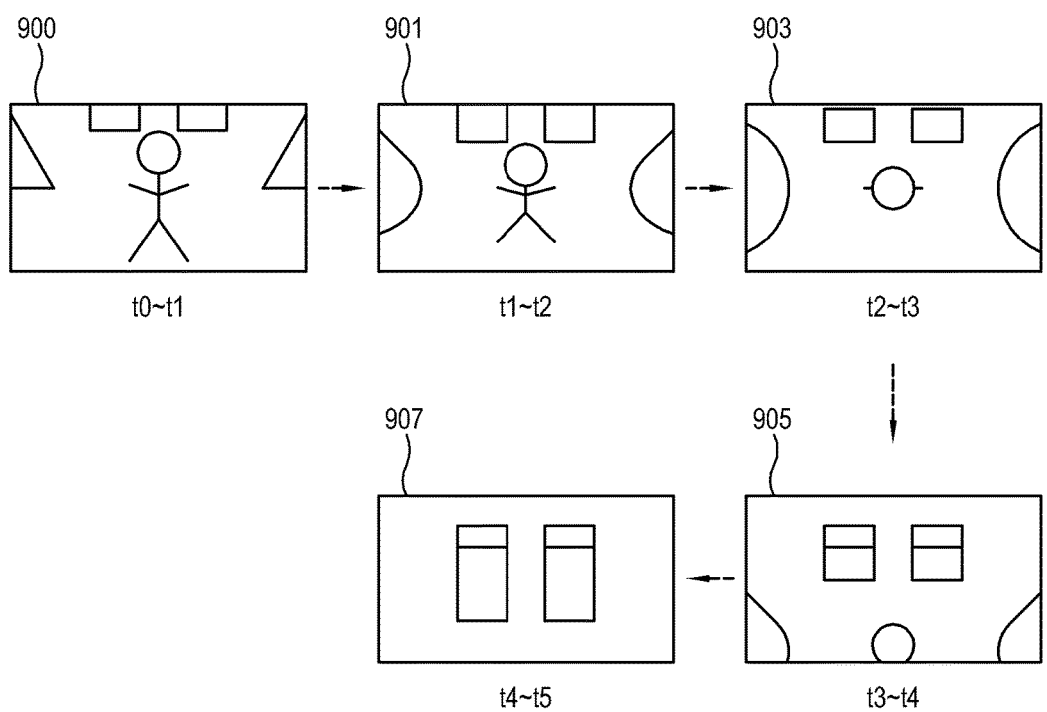
FIG. 9 is a diagram illustrating an example process of changing a viewpoint into a predetermined viewpoint based on a speed at which the viewpoint is moved according to an example embodiment, in accordance with the waveform of FIG. 6.

FIG. 9 is a diagram illustrating an example process of changing a viewpoint into a predetermined compulsory viewpoint based on each time section of the graph 600 by the display apparatus 1 according to an example embodiment. The display apparatus 1 may change the viewpoint (300 in FIG. 3) into the predetermined compulsory viewpoint according to the speed at which the viewpoint 300 is moved. The predetermined compulsory viewpoint may include, for example, a change from a front view to a top view, a change into a standard viewpoint of content being currently displayed, and so on, but is not limited thereto.

In FIG. 9, a reference numeral 900 may refer, for example, to a first image 900 in which the viewpoint 300 is a front view after the viewpoint 300 begins to move forward and before a speed at which the viewpoint 300 moves forward exceeds the critical speed Vcrit, at a time section t0~t1. A reference numeral 901 may refer, for example, to a second image 901 in which when the speed at which the viewpoint 300 moves forward increases to exceed the critical speed Vcrit, the viewpoint 300 is changing into a top view, at a time section t1~t2. A reference numeral 903 may refer, for example, to a third image 903 in which when the speed at which the viewpoint 300 moves forward reaches a maximum value, the viewpoint 300 is changed into the top view, at a time section t2~t3. Since the viewpoint 300 is changed into the top view while moving forward, the user may accurately know a current position. A reference numeral 905 may refer, for example, to a fourth image 905 in which as the speed at which the viewpoint 300 moves forward is decreased, the viewpoint 300 is changing from the top view to the front view, at a time section t3~t4. A reference numeral 907 may refer, for example, to a fifth image 907 in which as the speed at which the viewpoint 300 moves forward falls below the critical speed Vcrit, the viewpoint 300 is changed into the front view, at a time section t4~t5.

Although FIG. 9 illustrates a case in which the viewpoint 300 moves forward, the present disclosure is not limited thereto. Even if the viewpoint 300 is rotated left and right, the display apparatus 1 may change the viewpoint 300 into a proper compulsory viewpoint to enable the user to accurately know the current position.

Figure 10:
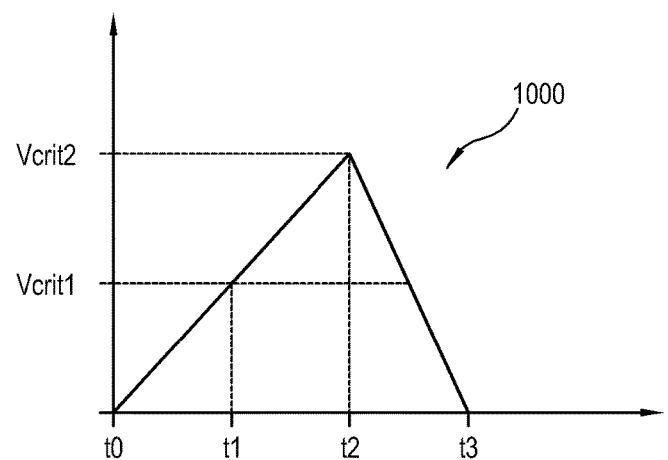
FIG. 10 is a diagram illustrating an example waveform of a speed at which the viewpoint is moved and a process of changing the viewpoint into a predetermined compulsory viewpoint in response to the speed at which the viewpoint is moved exceeding a second critical speed, according to an example embodiment.
Figure 10:
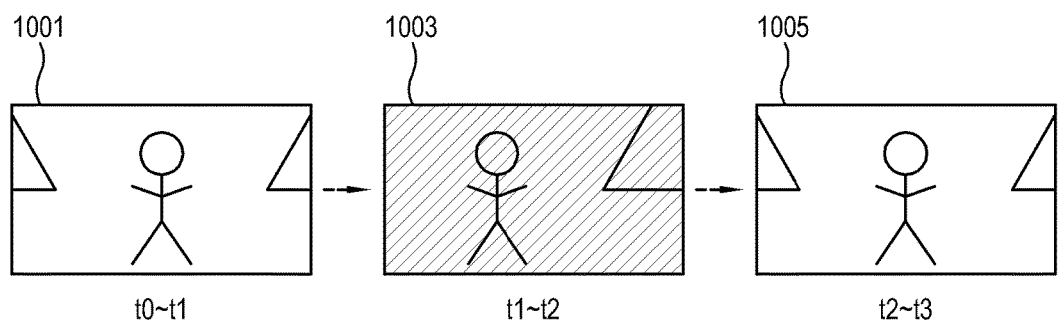

FIG. 10 is a diagram illustrating an example waveform of a speed at which the viewpoint is moved and a process of changing a viewpoint into a predetermined compulsory viewpoint in response to the speed at which the viewpoint is moved exceeding a second critical speed Vcrit2 over a first critical speed Vcrit1, according to an example embodiment. A graph 1000 plots a time where the viewpoint (300 in FIG. 3) is moved on an X-axis and a speed at which the viewpoint 300 is moved on an Y-axis. The viewpoint 300 begins to move at a time t0. The speed at which the viewpoint 300 is moved grows with time and reaches a first critical speed Vcrit1 at a time t1 and a second critical speed Vcrit2 at a time t2. The viewpoint 300 is moved in the same speed at a time section t2~t3. The speed at which the viewpoint 300 is moved begins to decrease from a time t3 and the viewpoint 300 stops moving at a time t3. If the speed at which the viewpoint 300 is moved exceeds the second critical speed Vcrit2, the display apparatus 1 may determine that the speed has increased too fast due to a user's inexperience, operation errors in the remote control 2, and so on. According to the determination result, the display apparatus 1 may change and fix the viewpoint 300 into and to a predetermined compulsory viewpoint or a standard viewpoint of content.

In FIG. 10, a reference numeral 1001 may refer, for example, to a first image 1001 in which the image effect is not provided after the viewpoint 300 begins to move and before the speed at which the viewpoint 300 moves forward exceeds the first critical speed Vcrit1, at a time section t0~t1. A reference numeral 1003 may refer, for example, to a second image 1003 to which when the speed at which the viewpoint 300 is moved increases to exceed the first critical speed Vcrit1, the image effect is added, at a time section t1~t2. A reference numeral 1005 may refer, for example to a third image 1005 in which as the speed at which the viewpoint 300 is moved exceed the second critical speed Vcrit2, the viewpoint 300 is changed into the predetermined compulsory viewpoint, at a time section t2~t3. In the example embodiment, although the predetermined compulsory viewpoint is illustrated as the first image 1001 before the speed at which the viewpoint 300 moves forward exceeds the first critical speed Vcrit1, the present disclosure is not limited thereto.

Also, the present disclosure is not limited to the drawings and the explanations as described above. The present disclosure may be applied to various example embodiments. For example, the display apparatus according to an example embodiment may be configured to skip some frames of the image until if the speed at which the viewpoint 300 is moved exceeds the second critical speed Vcrit2, the speed at which the viewpoint 300 is moved is reduced.

Figure 11:
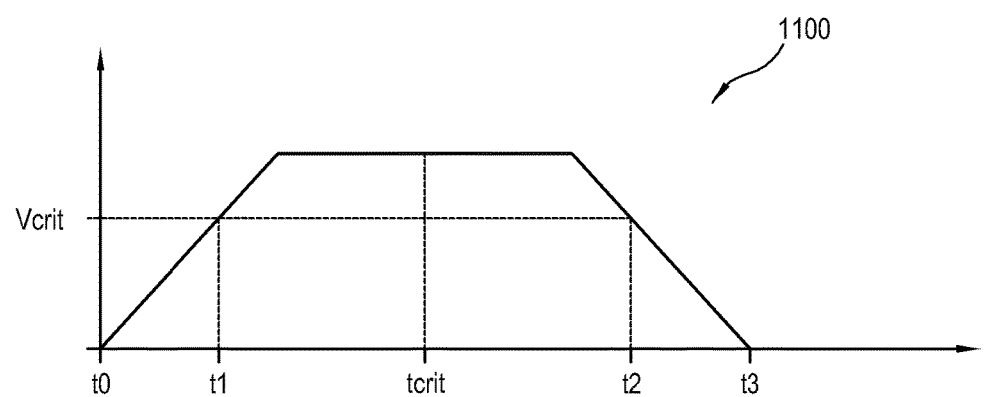
FIG. 11 is a diagram illustrating an example waveform of a speed at which the viewpoint is moved and a process of providing an image effect in response to the speed at which the viewpoint is moved being maintained for more than critical time, according to an example embodiment.
Figure 11:
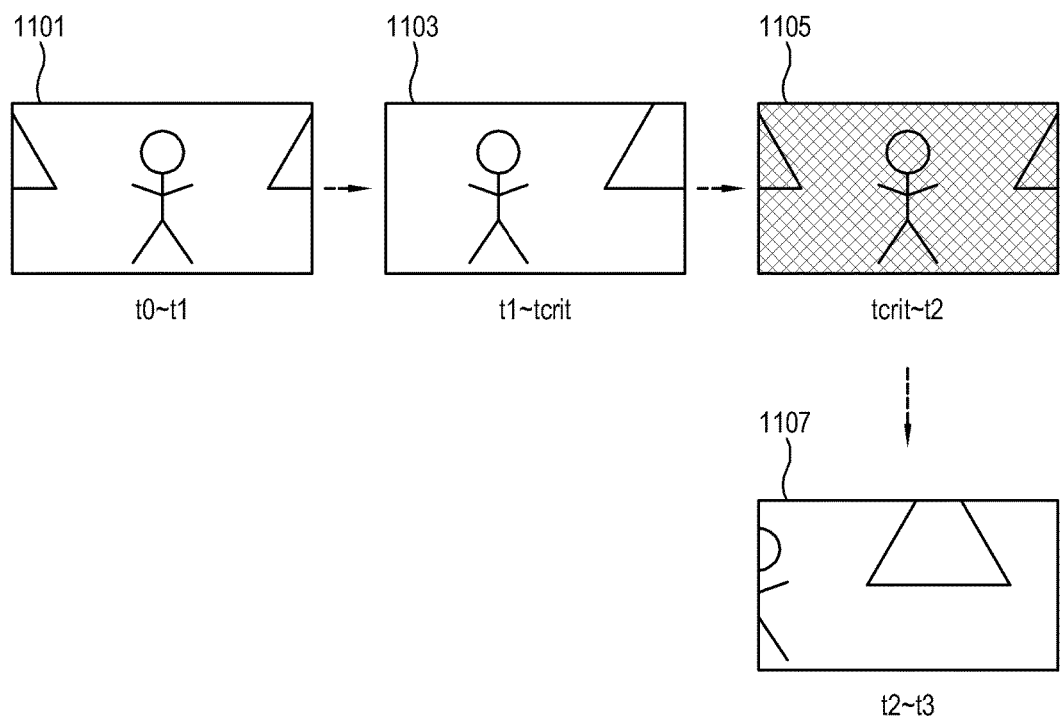

FIG. 11 is a diagram illustrating an example waveform of a speed at which the viewpoint is moved and a process of providing an image effect in response to the speed at which the viewpoint is moved being maintained for more than critical time, according to an example embodiment. A graph 1100 plots a time where the viewpoint (300 in FIG. 3) is moved on an X-axis and a speed at which the viewpoint 300 is moved on an Y-axis. The viewpoint 300 begins to move from a time t0. The speed at which the viewpoint 300 is moved grows with time and reaches a critical speed Vcrit1 at a time t1. The speed at which the viewpoint 300 is moved begins to decrease from a time t2 after a critical time tcrit. The viewpoint 300 stops moving at a time t3. The display apparatus may not provide the image effect until a predetermined time elapses after the speed at which the viewpoint 300 is moved exceeds the critical Vcrit.

In FIG. 11, a reference numeral 1101 may refer, for example, to a first image 1101 in which the image effect is not provided after the viewpoint 300 begins to move and until the speed at which the viewpoint 300 moves forward exceeds the critical speed Vcrit, at a time section t0~t1. A reference numeral 1103 may refer, for example, to a second image 1103 in which the image effect is not provided after the speed at which the viewpoint 300 is moved increases to exceed the critical speed Vcrit and until the critical time tcrit elapses, at a time section t1~tcrit. The critical time tcrit is set as a time after a predetermined time elapses from the time t1 where the speed at which the viewpoint 300 is moved exceeds the critical speed Vcrit. The display apparatus 1 does not provide the image effect until the critical time tcrit elapses after the speed at which the viewpoint 300 is moved exceeds the critical speed Vcrit. A reference numeral 1105 may refer, for example, to a third image 1105 in which the image effect is provided after the critical time tcrit elapses in a state where the speed at which the viewpoint 300 is moved exceeds the critical speed Vcrit, at a time section tcrit~t2. As described above, examples of the image effect may include changing the brightness, the clarity, the resolution, etc., but the present disclosure is not limited thereto. A reference numeral 1107 may refer, for example, to a fourth image 1107 in which the image effect is not provided as the speed at which the viewpoint 300 is moved falls below the critical speed Vcrit, at a time section t2~t3.

Figure 12:
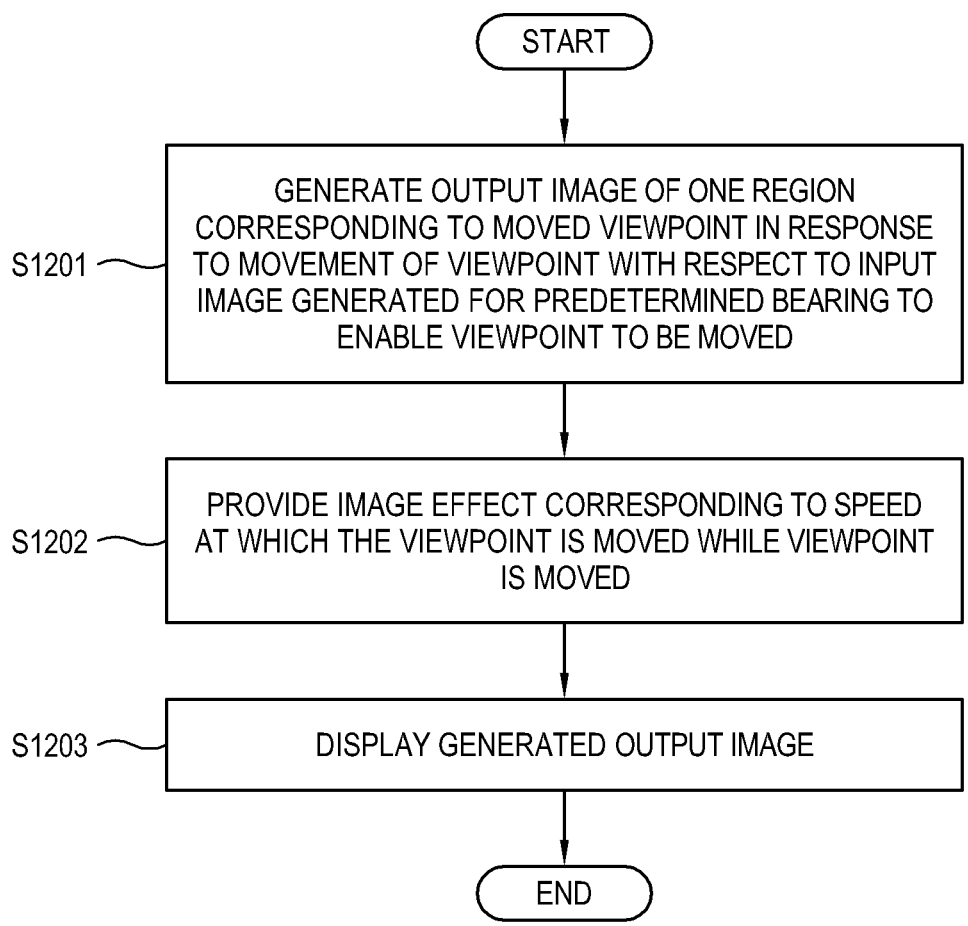
FIG. 12 is a flowchart illustrating an example process of controlling a display apparatus according to an example embodiment.

FIG. 12 is a flowchart illustrating an example process of controlling a display apparatus according to an example embodiment. At an operation S1200, the image processor 401 generates an output image (209 in FIG. 2) of one region (101 in FIG. 1) corresponding to the moved viewpoint 300 in response to a viewpoint (300 in FIG. 3) being moved with respect to an input image 100 generated for a predetermined bearing to enable the viewpoint 300 to be moved.

At an operation S1201, the image processor 401 provides an image effect corresponding to a speed at which the viewpoint is moved while the viewpoint is moved.

At operation S1202, the display 403 displays the generated output image 209. The display 403 may displays the generated output image 209 along with the image effect provided from the image processor 401.

While various example embodiments have been illustrated and described, it will be understood by those skilled in the art that various changes in form and details may be made therein without departing from the present disclosure as defined by the appended claims and their equivalents.

What is claimed is:

1. A display apparatus comprising:
    an image processor configured to process an input image to generate an output image;
    a display; and
    a controller configured to:
        control to display, on the display, a region of the output image corresponding to a viewpoint;
        identify a plurality of time sections while the viewpoint is moved with respect to the output image, the plurality of time sections comprising sections in which a movement speed of the viewpoint is accelerated, constant and decelerated, respectively; and
        control the display to provide a plurality of image effects to the output image, the provided plurality of image effects being different from one another in each of the identified plurality of time sections,
    wherein the plurality of image effects comprises at least one of a brightness, a clarity, a contrast, a tint or a resolution.

2. The apparatus according to claim 1, wherein the controller is configured to control the image processor to not provide an image effect until a predetermined time elapses in a state in which the movement speed of the viewpoint exceeds a critical speed.

3. The apparatus according to claim 1, wherein the controller is configured to change the viewpoint to a predetermined compulsory viewpoint in response to the movement speed of the viewpoint exceeding a critical speed.

4. The apparatus according to claim 1, wherein the controller is configured to control the image processor to provide a first image effect during a first time section within which the movement speed of the viewpoint is accelerated and a second image effect during a second time section within which the movement speed of the viewpoint is decelerated.

5. The apparatus according to claim 1, wherein the controller is configured to control the image processor to provide the plurality of image effects to the output image corresponding to degrees of the movement speed of the viewpoint.

6. The apparatus according to claim 1, wherein the controller is configured to control the display to provide information with respect to the movement speed of the viewpoint.

7. The apparatus according to claim 6, wherein the information comprises at least one of: a direction in which the viewpoint is moved, a speed at which the viewpoint is moved, and a distance at which the viewpoint has been moved from a predetermined standard viewpoint.

8. The apparatus according to claim 1,
wherein the controller is configured to provide a user interface (UI) which is changed in at least one of: a brightness, a color, an opacity, a size, and a number of items, corresponding to the movement speed of the viewpoint.

9. The apparatus according to claim 1, wherein the controller is configured to identify the plurality of time sections within which the movement speed of the viewpoint exceeds a critical speed.

10. A method of controlling a display apparatus comprising:
processing an input image to generate an output image;
displaying a region of the generated output image corresponding to a viewpoint;
while the viewpoint is moved with respect to the output image, identifying a plurality of time sections, the plurality of time sections comprising sections in which a movement speed of the viewpoint is accelerated, constant and decelerated, respectively; and
providing plurality of image effects, to the output image, the provided plurality of image effects being different from each other in each of the identified plurality of time sections,
wherein the plurality of image effects comprises at least one of a brightness, a clarity, a contrast, a tint or a resolution.

11. The method according to claim 10, wherein the providing the plurality of image effects comprises not providing an image effect until a predetermined time elapses in a state in which the movement speed of the viewpoint exceeds a critical speed.

12. The method according to claim 10, wherein the providing the plurality of image effects comprises changing the viewpoint to a predetermined compulsory viewpoint in response to the movement speed of the viewpoint exceeding a critical speed.

13. The method according to claim 10, wherein the providing the plurality of image effects comprises providing a first image effect during a first time section within which the movement speed of the viewpoint is accelerated and a second image effect during a second time section within which the movement speed of the viewpoint is decelerated.

14. The method according to claim 10, further comprising providing information with respect to the movement speed of the viewpoint.

15. The method according to claim 14, wherein the information comprises at least one of: a direction in which the viewpoint is moved, a speed at which the viewpoint is moved, and a distance at which the viewpoint has been moved from a predetermined standard viewpoint.

16. The method according to claim 10, further comprising:
providing a user interface (UI) which is changed in at least one of: a brightness, a color, an opacity, a size, and a number of items, based on the movement speed if the viewpoint.

17. The method according to claim 10, further comprising identifying the plurality of time sections within which the movement speed of the viewpoint exceeds a critical speed.

* * * * *